(12) United States Patent
Kim et al.

(10) Patent No.: US 12,090,947 B2
(45) Date of Patent: Sep. 17, 2024

(54) AIR BAG DEVICE

(71) Applicants: Hyundai Motor Company, Seoul (KR); Kia Corporation, Seoul (KR); Hyundai Mobis Co., Ltd., Seoul (KR)

(72) Inventors: Sung Hoon Kim, Incheon (KR); Dong Gil Lee, Yongin-si (KR); Sang Won Hwangbo, Yongin-si (KR); Jiwoon Song, Yongin-si (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/346,606

(22) Filed: Jul. 3, 2023

(65) Prior Publication Data
US 2024/0270195 A1    Aug. 15, 2024

(30) Foreign Application Priority Data
Feb. 14, 2023    (KR) .................. 10-2023-0019457

(51) Int. Cl.
   *B60R 21/233*    (2006.01)
   *B60R 21/207*    (2006.01)
   *B60R 21/231*    (2011.01)

(52) U.S. Cl.
   CPC .......... *B60R 21/233* (2013.01); *B60R 21/207* (2013.01); *B60R 21/23138* (2013.01);
   (Continued)

(58) Field of Classification Search
   CPC .......... B60R 2021/23107; B60R 2021/23146; B60R 21/23138; B60R 21/207; B60R 21/231
   See application file for complete search history.

(56) References Cited

U.S. PATENT DOCUMENTS 9,744,932 B1    8/2017  Faruque et al.
10,513,206 B2  12/2019  Spahn et al.
(Continued)

FOREIGN PATENT DOCUMENTS

DE  102019124091 A1 *  7/2020  ............ B60R 21/16
EP       3192706 B1     12/2019
(Continued)

OTHER PUBLICATIONS

Mingxi et al., Gas bag arrangement for a vehicle occupant restraint system, Jul. 30, 2020, EPO, DE 10 2019 124 091 A1, Machine Translation of Description (Year: 2020).*

(Continued)

*Primary Examiner* — James A English
(74) *Attorney, Agent, or Firm* — SLATER MATSIL, LLP

(57) ABSTRACT

An embodiment air bag device includes a first chamber, wherein in a deployed state, the first chamber surrounds a first portion and a front portion of a seat with a frontal surrounding portion of the first chamber expanding toward a second portion, a second chamber, wherein in the deployed state, the second chamber surrounds the second portion and the front portion of the seat with a frontal surrounding portion of the second chamber expanding toward the first portion and overlaps with the first chamber behind the first chamber, and a first fastener provided at a portion where the first chamber and the second chamber overlap with each other and fastening the first chamber and the second chamber to each other.

14 Claims, 12 Drawing Sheets

(52) U.S. Cl.
CPC ............... *B60R 2021/23146* (2013.01); *B60R 2021/23316* (2013.01)

(56) References Cited

U.S. PATENT DOCUMENTS

| | | |
|---|---|---|
| 2017/0225641 A1 | 8/2017 | Faruque et al. |
| 2017/0247006 A1 | 8/2017 | Rao et al. |
| 2017/0259772 A1 | 9/2017 | Farooq et al. |
| 2017/0259774 A1 | 9/2017 | Matsushita et al. |
| 2018/0050651 A1* | 2/2018 | Fukawatase ........... B60R 21/233 |
| 2019/0077359 A1* | 3/2019 | Kim ....................... B60R 21/233 |
| 2019/0389420 A1* | 12/2019 | Dry ........................ B60R 21/231 |
| 2020/0101921 A1* | 4/2020 | Nagasawa .............. B60R 21/231 |
| 2022/0111813 A1* | 4/2022 | Kim ....................... B60R 21/235 |

FOREIGN PATENT DOCUMENTS

| | | | | |
|---|---|---|---|---|
| FR | 3116777 A1 * | 6/2022 | ........... B60R 21/231 |
| KR | 102096933 B1 | 4/2020 | |
| KR | 20220048805 A | 4/2022 | |
| WO | WO-2019121222 A1 * | 6/2019 | |

OTHER PUBLICATIONS

Renaud Ruffet, Device for Retaining an Occupant of a Motor Vehicle Seat, Jun. 3, 2022, EPO, FR 3116777 A1, Machine Translation of Description (Year: 2022).*

Bogdanovic et al., Vehicle-Occupant Protection System, and Method for Operating a Vehicle-Occupant Protection System, Jun. 27, 2019, EPO, WO 2019/121222 A1, Machine Translation of Description (Year: 2019).*

* cited by examiner

AIR BAG DEVICE

CROSS-REFERENCE TO RELATED APPLICATIONS

This application claims the benefit of Korean Patent Application No. 10-2023-0019457, filed on Feb. 14, 2023, which application is hereby incorporated herein by reference.

TECHNICAL FIELD

The present disclosure relates to an air bag device.

BACKGROUND

In a full self-driving vehicle, as seat positions and functions diversify, there is a need to respond to a collision situation occurring in all directions.

Accordingly, an increase in the size of an air bag is required, but due to cockpit slimness, a space in which the air bag may be mounted is small, so that there is a difficulty in increasing the size of the air bag.

Meanwhile, air bags of various concepts have been developed to safely restrain a passenger in various seat positions.

However, conventional air bags do not directly restrain the passenger, thereby causing a problem that is difficult to respond to various collision modes.

Accordingly, in order to respond to various collision modes, a method of increasing the number of air bags or of applying a seat belt may be considered, but the space in which this restraining device may be additionally mounted is gradually growing insufficient and there is a problem in that actual application may be difficult.

The description provided above as the background is just for helping understand the background of embodiments of the present disclosure and should not be construed as being included in the related art known by those skilled in the art.

SUMMARY

The present disclosure relates to an air bag device. Particular embodiments relate to an air bag device capable of responding to various collision modes by directly restraining a passenger in a seat of various positions with fastening of chambers that surround spaces on the left and right of the passenger.

Embodiments of the present disclosure have been made keeping mind problems occurring in the related art, and embodiments of the present disclosure provide an air bag device capable of responding to various collision modes by directly restraining a passenger in a seat of various positions with fastening chambers surrounding spaces on the left and right of the passenger.

According to an embodiment of the present disclosure, there is provided an air bag device including a first chamber configured to be deployed in a shape that surrounds a first portion and a front portion of a seat and configured to be deployed in a shape in which a frontal surrounding portion thereof expands toward a second portion. A second chamber is configured to be deployed in a shape that surrounds the second portion and the front portion of the seat, configured to be deployed in a shape in which a frontal surrounding portion thereof expands toward the first portion, and configured to be overlapped with the first chamber behind the first chamber. A first fastener is provided at a portion where the first chamber and the second chamber are overlapped with each other, to fasten the first chamber and the second chamber to each other.

The first chamber may include a first side part fixed to the first portion of the seat and configured to cover the first portion of the seat and a first front part bent from a front end of the first side part toward the front portion of the seat and configured to cover the front portion of the seat. The second chamber may include a second side part fixed to the second portion of the seat and configured to cover the second portion of the seat and a second front part bent from a front end of the second side part toward the front portion of the seat and configured to cover the front portion of the seat and to be overlapped with the first front part behind the first front part.

The first chamber and the second chamber may be configured to be deployed with a time gap.

A rear surface of the first front part and a front surface of the second front part may be formed to face each other in a shape that may be inclined rearward from the first portion toward the second portion, and the first fastener may be configured to be fastened between the first front part and the second front part in a surface contact state.

The first fastener may be a first front hook and loop (e.g., Velcro®) fastener and a second front hook and loop fastener fixed to the rear surface of the first front part and the front surface of the second front part and configured to be attached and detached. A joined surface of the first front hook and loop fastener and the second front hook and loop fastener may be formed in a shape that may be bent or curved in forward and rearward directions at least once.

The joined surface of the first front hook and loop fastener and the second front hook and loop fastener may include a first region formed in a shape that may be bent toward the first side part on the basis of a fixed surface where the first and second front hook and loop fasteners are fixed to each of the first front part and the second front part and a second region connected to the first region and formed in a shape that may be bent toward the second side part on the basis of the fixed surface.

The first fastener may be a first side hook and loop fastener and a second side hook and loop fastener fixed to a lateral surface of the first side part and a lateral surface of the second front part and configured to be attached and detached.

The air bag device may include a side tether connected to at least one or more of a portion between a first portion of a seat back and the first side part and a portion between a second portion of the seat back and the second side part.

The air bag device may include a cross tether connected to both of the first side part and the first front part while being located therebetween.

A height of the first chamber may be formed longer than a height of the second chamber to form a step difference, and the cross tether may be configured to be deployed within the step difference region.

An inner tether may be connected to at least one or more of an internal portion in a transverse width direction of each of the first side part and the second side part and an internal portion in a longitudinal width direction of each of the first front part and the second front part, and a flow hole through which gas flows may be formed in the inner tether.

The air bag device may include a second fastener provided at a portion where the first chamber and the second chamber may be overlapped with each other along a circumference of the first fastener and configured to fasten the first chamber to the second chamber in a fastening method different from a fastening method of the first fastener.

The second fastener may be a first magnet and a second magnet fixed to a rear surface of the first front part and a front surface of the second front part and configured to be attached and detached.

The first magnet may be formed with a height shorter than the front hook and loop fastener that may be fixed to the first front part as the first fastener, and the second magnet may be formed with a height shorter than the second front hook and loop fastener that may be fixed to a front surface of the second front part fixed as the first fastener.

The air bag device may include a third fastener provided between a corner part and the second front part, the corner part being formed between the first side part and the first front part and the second front part facing the corner part and configured to fasten the first chamber and the second chamber to each other in a fastening method different from the first fastener.

The third fastener may include a bridge fixed to the corner part and a hook fixed to the second front part to face the bridge and configured to be fastened by being caught by the bridge.

According to the technical solution described above, the air bag device of embodiments of the present disclosure is deployed in a shape surrounding the spaces on opposite sides of the passenger with the first chamber and the second chamber, and the first chamber and the second chamber are directly fastened to each other at the front of the passenger, so that the air bag cushion entirely surrounds the spaces on opposite sides and the front space of the passenger sitting in the seat. Therefore, with respect to the seat in various locations and the passenger's various postures, the air bag device restrains the passenger, so that resonance to various collision modes is possible and the passenger can be safely protected.

DETAILED DESCRIPTION OF ILLUSTRATIVE EMBODIMENTS

Figure 1:
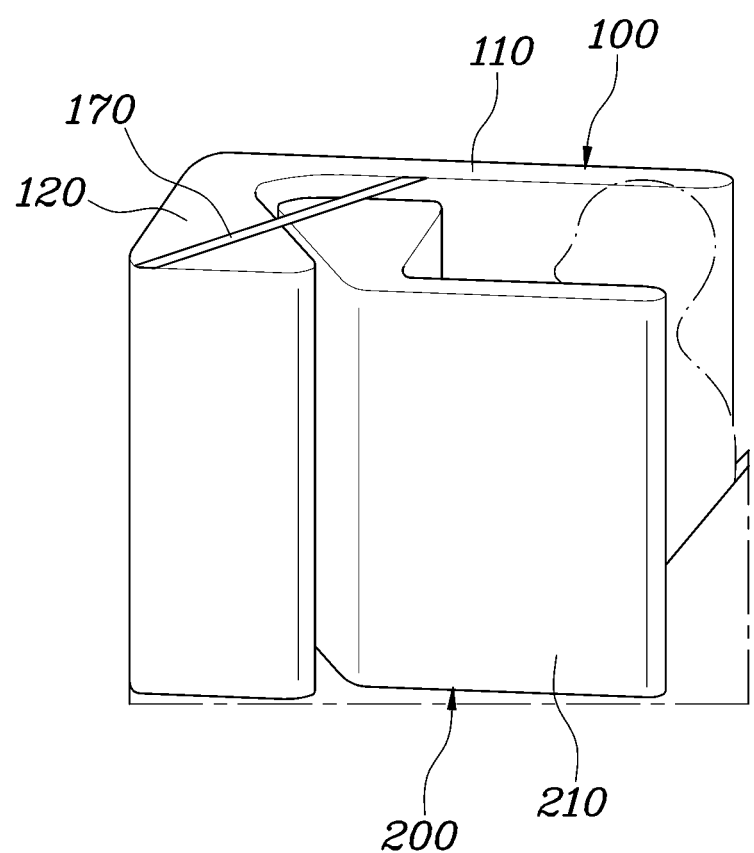
FIG. 1 is a view showing a deployment shape of an air bag according to embodiments of the present disclosure.

Hereinafter, embodiments of the present disclosure will be described in detail with reference to the accompanying drawings and the same or similar components are given the same reference numerals throughout the figures and are not repeatedly described.

The terms "module" and "unit" that are used for components in the following description are used only for the convenience of description without having discriminate meanings or functions.

In the following description, if it is decided that the detailed description of known technologies related to embodiments of the present disclosure makes the subject matter of the embodiments described herein unclear, the detailed description is omitted. Further, the accompanying drawings are provided only for easy understanding of embodiments disclosed in the specification, the technical spirit disclosed in the specification is not limited by the accompanying drawings, and all changes, equivalents, and replacements should be understood as being included in the spirit and scope of the present disclosure.

Terms including ordinal numbers such as "first," "second," etc. may be used to describe various components, but the components are not to be construed as being limited to the terms. The terms are used only to distinguish one component from another component.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween.

Singular forms are intended to include plural forms unless the context clearly indicates otherwise.

It will be further understood that the terms "comprise" and "have" used in this specification specify the presence of stated features, steps, operations, components, parts, or a combination thereof, but do not preclude the presence or addition of one or more other features, numerals, steps, operations, components, parts, or a combination thereof.

Hereinbelow, exemplary embodiments of the present disclosure will be described in detail with reference to the accompanying drawings.

An air bag device of embodiments of the present disclosure includes a first chamber 100 of which a first side part 110 and a first front part 120 are deployed in a shape that surrounds a first portion and a front portion of a seat 20, and the first front part 120 is deployed in a shape expanding toward a second portion thereof, a second chamber 200 of which a second side part 210 and a second front part 220 are deployed in a shape that surrounds the second portion and the front portion of the seat 20, and the second front part 220 is deployed in a shape expanding toward the first portion to be overlapped with the first front part 120 behind the first front part 120, and a first fastener provided in a portion where the first chamber 100 and the second chamber 200 are overlapped with each other to fasten the first chamber 100 to the second chamber 200.

Figure 2:
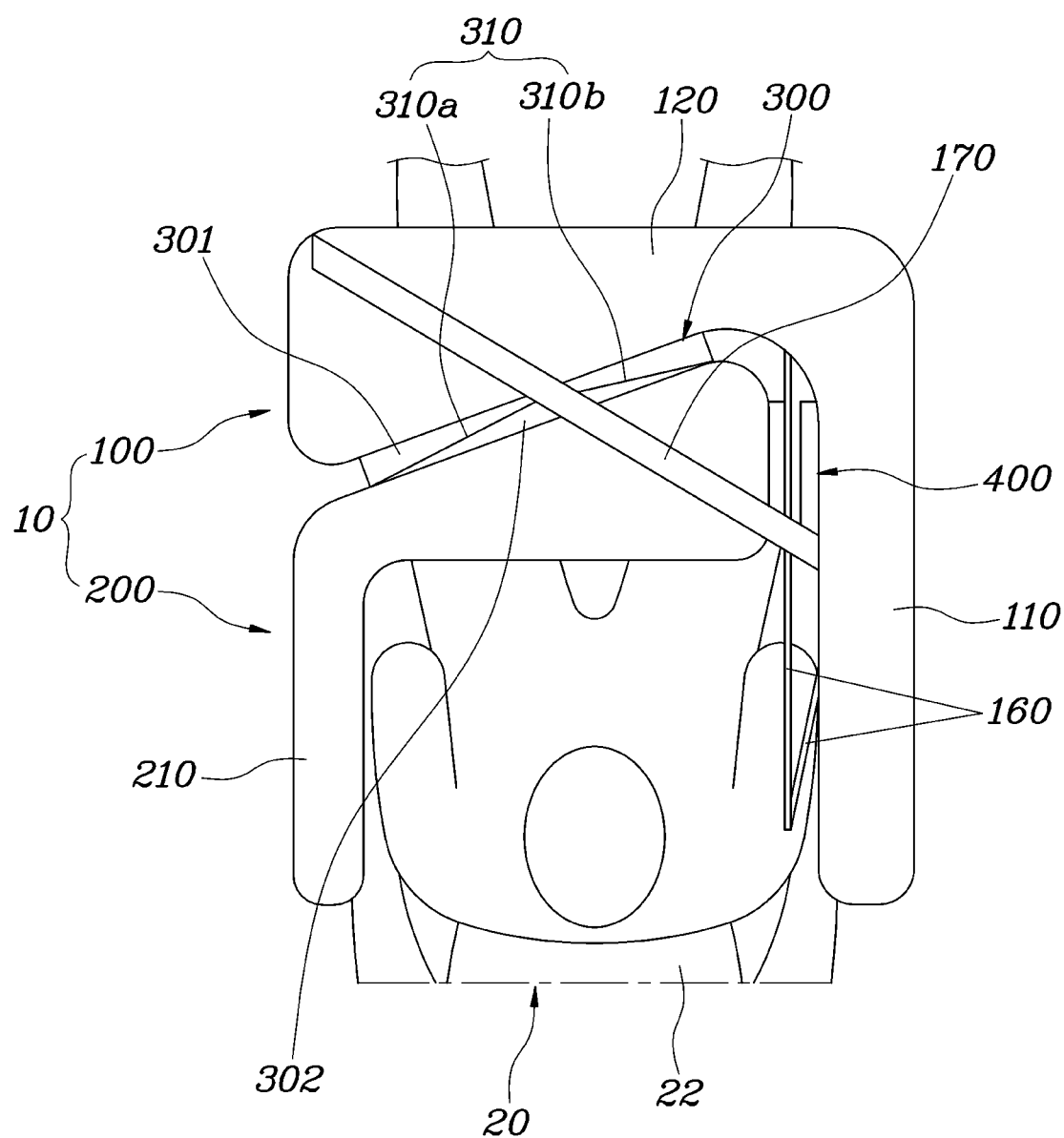
FIG. 2 is a view showing a first chamber and a second chamber that are deployed and fastened to each other with a front hook and loop fastener according to embodiments of the present disclosure.

Referring to FIGS. 1 and 2, a first end of the first chamber 100 is fixed to a first portion of a seat back 22 and is deployed forward, and a first end of the second chamber 200 is fixed to a second portion of the seat back 22 and is deployed forward.

In addition, a portion where the first end of the first chamber 100 is connected to a second end thereof at a front of the seat 20 and a portion where the first end of the second chamber 200 is connected to a second end thereof at a front of the seat 20 are deployed to be overlapped with each other at the front space of a passenger sitting on the seat 20.

At this point, a portion where the first chamber 100 is overlapped with the second chamber 200 is deployed in a shape with a volume thereof expanding toward the second chamber 200, and a portion where the second chamber 200 is overlapped with the first chamber 100 is deployed in a shape with a volume thereof expanding toward the first chamber 100.

In this state, the first chamber 100 and the second chamber 200 are fastened to each other at an overlapped portion by the first fastener.

In other words, the first chamber 100 and the second chamber 200 are deployed in a shape surrounding the opposite portions of the passenger, and the first chamber 100 and the second chamber 200 are fastened to each other at a front of the passenger, so that an air bag cushion 10 including the first chamber 100 and the second chamber 200 surrounds entirely the opposite lateral spaces and the front space of the passenger sitting on the seat 20.

Therefore, as the air bag directly restrains the passenger with respect to the seat 20 in various positions and the passenger with various postures, it is possible to respond to various collision modes and to safely protect the passenger, and the air bag can be substituted for a seat, etc. as well as air bags at other different locations, thereby significantly increasing the marketability thereof.

Specifically, as a front portion of the second chamber 200 expands toward the first chamber 100 and a front portion of the first chamber 100 expands toward the second chamber 200 so that the portions are overlapped with each other, when the passenger sits on the air bag cushion 10, a larger resistance is generated in a pushing direction from the front portion of the second chamber 200 toward the front portion of the first chamber 100, so as to make a movement in which the second chamber 200 is separated out of the first chamber 100 difficult, thereby further safely restraining the passenger.

In addition, the first chamber 100 includes the first side part 110 and the first front part 120, and the second chamber 200 includes the second side part 210 and the second front part 220.

Referring to FIGS. 1 and 2, when looking at the structure of the first chamber 100 and the second chamber 200 in detail, the first chamber 100 includes the first side part 110 fixed to the first portion of the seat 20 and covering the first portion of the seat 20 with the first front part 120 being bent from a front end of the first side part 110 toward the front space of the seat 20 to cover the front space of the seat 20.

The second chamber 200 includes the second side part 210 fixed to the second portion of the seat 20 and covering the second portion of the seat 20 with the second front part 220 being bent from a front end of the second side part 210 toward the front space of the seat 20 to cover the front space of the seat 20 and be overlapped with the first front part 120 behind the first front part 120.

For example, a rear end of the first side part 110 is fixed to a first portion of a seat back frame provided inside the seat back 22, and the front end of the first side part 110 is deployed forward to cover the first portion of the seat 20.

In addition, a front end of the first front part 120 is connected to a first end of the first side part 110, and a second end of the first side part 110 is deployed in a direction perpendicular to the second portion of the seat 20 so that the first chamber 100 is deployed in an 'L' shape.

For example, a rear end of the second side part 210 is fixed to a second portion of the seat back frame provided inside the seat back 22, and the front end of the second side part 210 is deployed forward to cover the second portion of the seat 20.

In addition, a front end of the second front part 220 is connected to a first end of the second side part 210, and a second end of the second side part 210 is deployed in a direction perpendicular to the second portion of the seat 20 so that the second chamber 200 is deployed in an 'L' shape.

At this time, the second front part 220 is deployed in an overlapped shape behind the first front part 120, and for this deployment, a longitudinal length of the first side part 110 is formed longer than a longitudinal length of the second side part 210.

In addition, the first chamber 100 and the second chamber 200 may be deployed with a time gap.

In other words, it may be configured such that the first chamber 100 is deployed before deployment of the second chamber 200, or the second chamber 200 is deployed before deployment of the first chamber 100.

This is implemented by controlling an ignition timing of an inflator that injects gas into the first chamber 100 and the second chamber 200.

In addition, embodiments of the present disclosure may be configured such that a rear surface of the first front part 120 and a front surface of the second front part 220 are formed to face each other in a shape that is inclined rearward from the first portion toward the second portion of the seat, and the first fastener may be fastened to both of the first front part 120 and the second front part 220 in a surface contact state while being located therebetween.

When looking at this structure referring to FIG. 2, the first front part 120 is formed in a right triangle shape and the second front part 220 is formed in a right triangle shape symmetrical to the first front part 120, so that the first front part 120 and the second front part 220 are deployed in a rearward inclined shape while an inclined surface of the first front part 120 and an inclined surface of the second front part 220 face each other.

In addition, the first fastener is fastened to the first front part 120 and the second front part 220 in the surface contact state between the inclined surface of the first front part 120 and the inclined surface of the second front part 220, so that the first chamber 100 and the second chamber 200 are fastened to each other.

In other words, an inclined surface is formed between the first front part 120 and the second front part 220, and the first chamber 100 and the second chamber 200 are fastened to each other with the first fastener on the inclined surfaces, so that a fastening region due to the first fastener increases, thereby increasing a fastening force between the first chamber 100 and the second chamber 200.

As an exemplary embodiment of the first fastener, the first fastener is a first front Velcro®-type fastener 301 and a second front hook and loop fastener 302 fixed to the rear surface of the first front part 120 and the front surface of the second front part 220 and attached and detached. A joined surface 310 of the first front hook and loop fastener 301 and the second front hook and loop fastener 302 may be formed in a shape that is bent or curved in forward and rearward directions at least once.

For example, the first front hook and loop fastener 301 and the second front hook and loop fastener 302 are attached such that the first front hook and loop fastener 301 is fixed to the inclined surface formed on the rear surface of the first front part 120 and the second front hook and loop fastener 302 is fixed on the inclined surface formed on the front surface of the second front part 220 thereto.

In addition, the second front hook and loop fastener 302 has a bottom surface formed in an isosceles triangular shape formed transversely long, and the bottom surface is formed to protrude toward the first front part 120 while being fixed to the front surface of the second front part 220.

Furthermore, the first front hook and loop fastener 301 is formed in a groove shape of an isosceles triangular shape corresponding to the second front hook and loop fastener 302 so that a protruding external surface of the second front hook and loop fastener 302 is attached to a recessed internal surface of the first front hook and loop fastener 301.

In other words, a middle portion of the joined surface 310 where the first front hook and loop fastener 301 and the second front hook and loop fastener 302 are joined to each other is formed in a shape bent once so as to increase an area of the joined surface 310, thereby increasing the fastening force between the first chamber 100 and the second chamber 200.

Moreover, the joined surface 310 of the first front hook and loop fastener 301 and the second front hook and loop fastener 302 includes a first region 310a formed in a shape bent toward the first side part 110 on the basis of a fixed surfaces where the first front hook and loop fastener 301 and the second front hook and loop fastener 302 are fixed to the first front part 120 and the second front part 220 and a second region 310b connected to the first region 310a and formed in a shape bent toward the second side part 210 on the basis of the fixed surface.

For example, as shown in FIG. 2, in the joined surface 310 of the first front hook and loop fastener 301 and the second front hook and loop fastener 302, a portion close to the second side part 210 is the first region 310a, and a portion close to the first side part 110 is the second region 310b.

Thus, in a frontal collision, the body of the passenger moves forward and a force of which the second front part 220 pushes the first front part 120 forward is applied.

Therefore, while a fastening force is uniformly formed throughout all of the first region 310a and the second region 310b, the first front hook and loop fastener 301 and the second front hook and loop fastener 302 are fastened to each other, thereby safely restraining the passenger.

In addition, in a lateral collision in which the passenger moves leftward, a force of which the second front part 220 pushes the first front part 120 leftward is applied.

Therefore, while the first region 310a generates a main fastening force and the second region 310b generates a sub fastening force relatively smaller than the fastening force of the first region 310a, the first front hook and loop fastener 301 and the second front hook and loop fastener 302 are fastened to each other, thereby safely restraining the passenger.

Furthermore, in a lateral collision in which the passenger moves rightward, a force of which the first front part 120 pulls the second front part 220 rightward is applied.

Therefore, while the first region 310a generates a main fastening force and the second region 310b generates a sub fastening force relatively smaller than the fastening force of the first region 310a, the first front hook and loop fastener 301 and the second front hook and loop fastener 302 are fastened to each other, thereby safely restraining the passenger.

Figure 6:
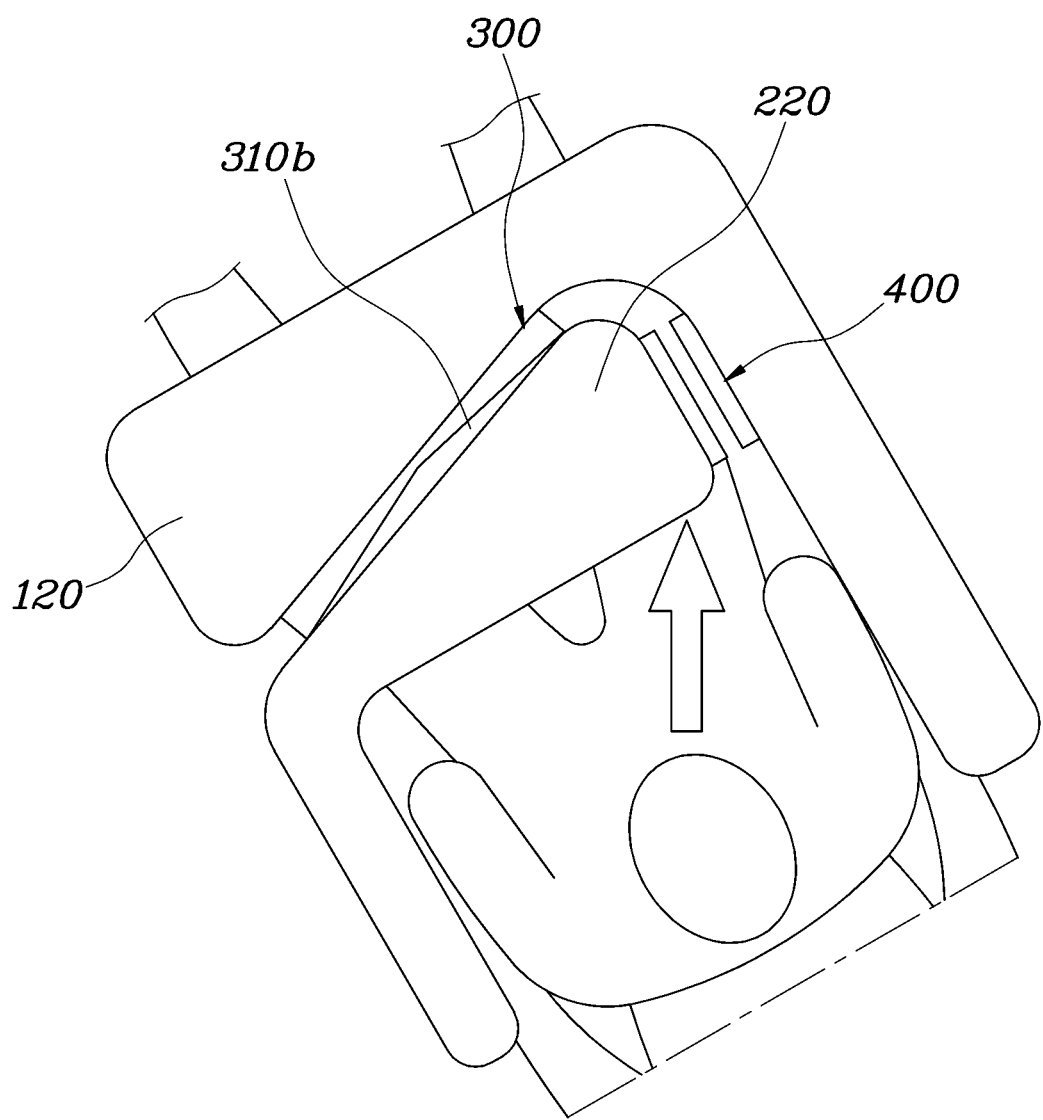
FIGS. 6 and 7 are views showing, in a swivel collision, the first chamber and the second chamber that are deployed and fastened to each other with the front hook and loop fastener according to embodiments of the present disclosure.

Furthermore, in a swivel collision in the seat arrangement as shown in FIG. 6, the body of the passenger moves forward and a force of which the second front part 220 pushes the first front part 120 forward is applied.

Therefore, while the second region 310b generates a main fastening force and the first region 310a generates a sub fastening force relatively smaller than the fastening force of the second region 310b, the first front hook and loop fastener 301 and the second front hook and loop fastener 302 are fastened to each other, thereby safely restraining the passenger.

Figure 7:
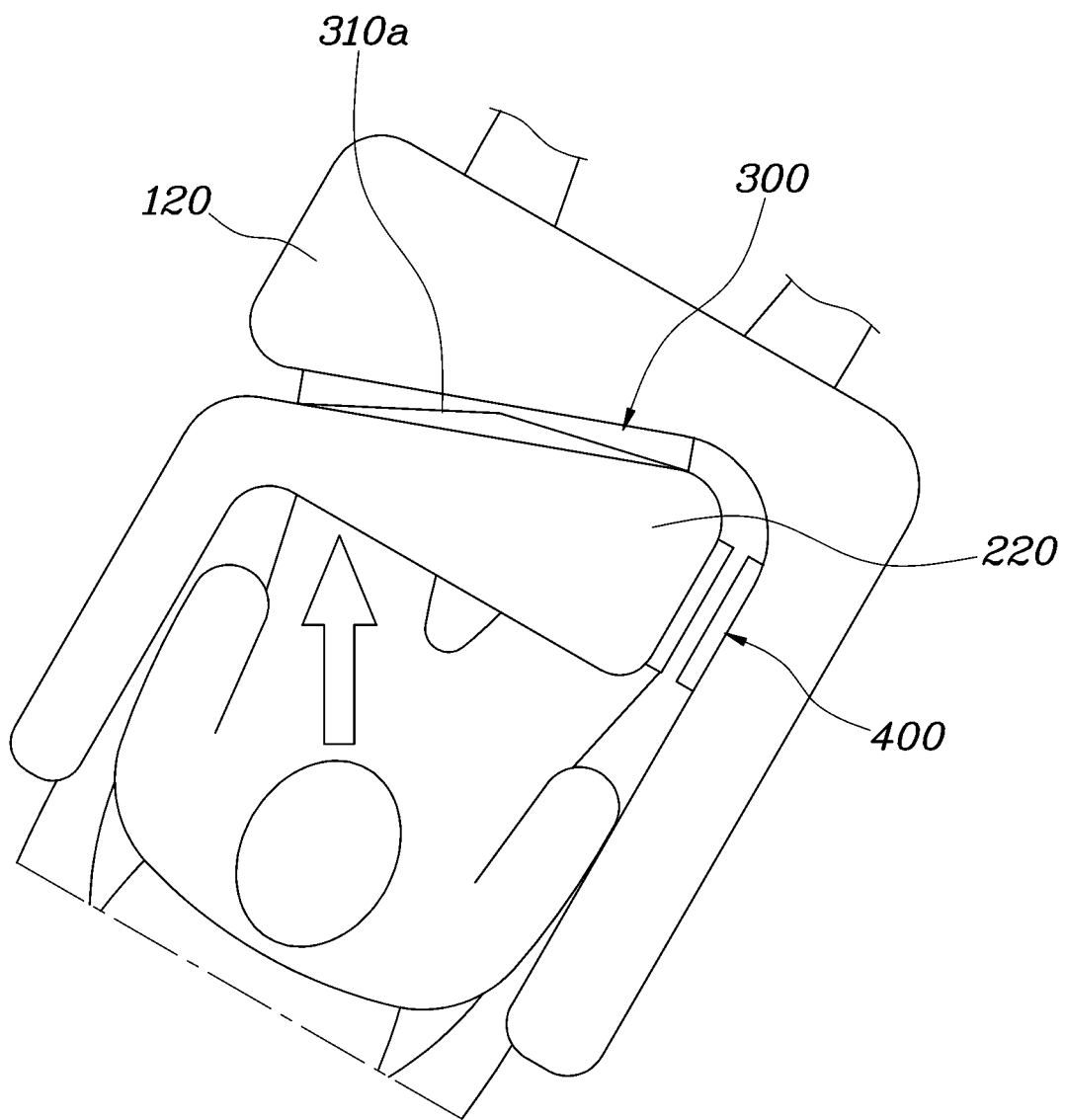

Furthermore, in a swivel collision in the seat arrangement as shown in FIG. 7, the body of the passenger moves forward and a force of which the second front part 220 pushes the first front part 120 forward is applied.

Therefore, while the first region 310a generates a main fastening force and the second region 310b generates a sub fastening force relatively smaller than the fastening force of the first region 310a, the first front hook and loop fastener 301 and the second front hook and loop fastener 302 are fastened to each other, thereby safely restraining the passenger.

In addition, the first fastener may be a first side hook and loop fastener 401 and a second side hook and loop fastener 402 fixed to a lateral surface of the first side part 110 and a lateral surface of the second front part 220 and attached and detached.

Figure 5:
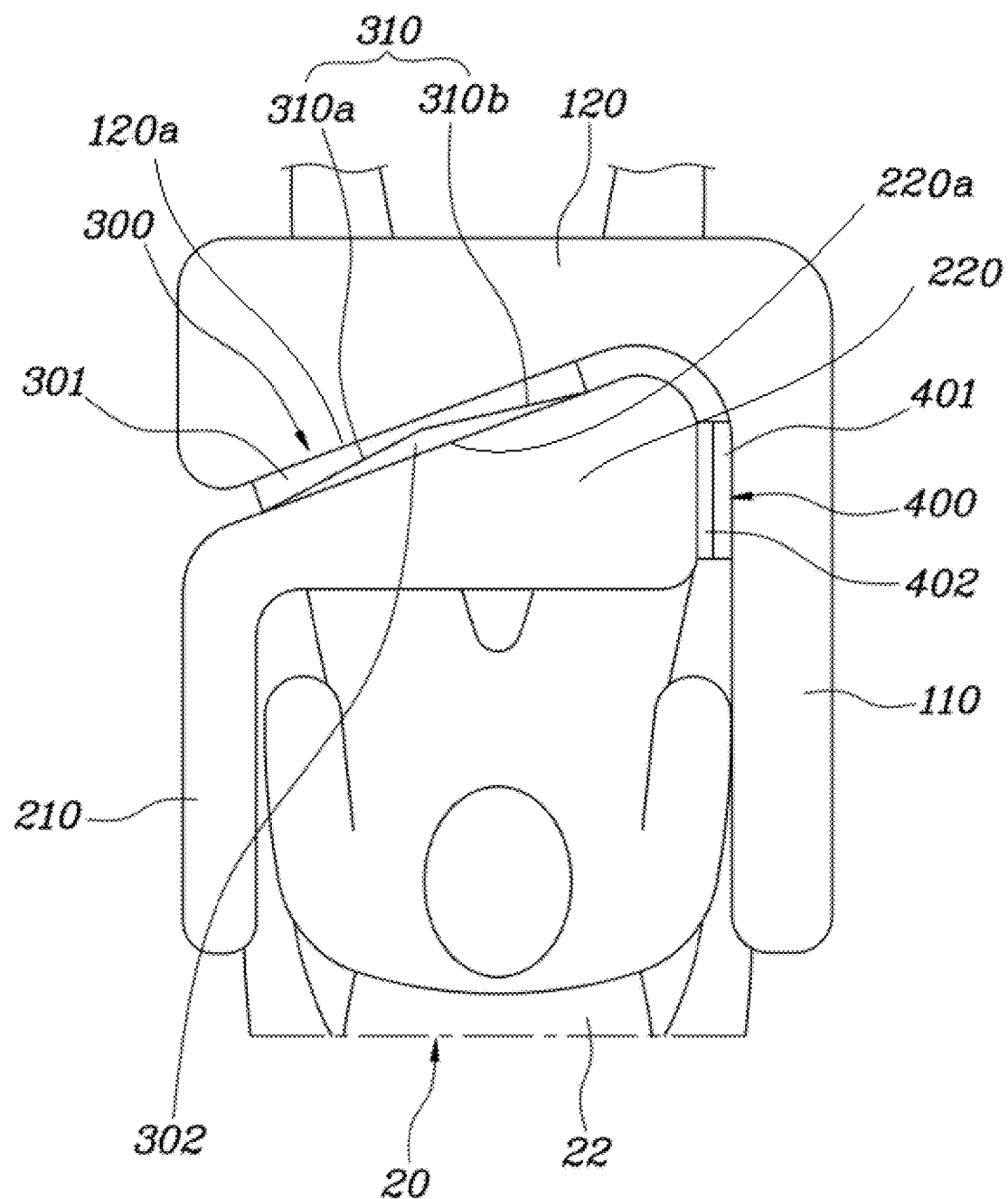
FIG. 5 is a view showing, in a lateral collision, the first chamber and the second chamber that are deployed and fastened to each other with a side hook and loop fastener according to embodiments of the present disclosure.

For example, as shown in FIG. 5, a first side hook and loop fastener 401 is fixed to an inner surface of the first side part 110 adjacent to the first front part 120, a second side hook and loop fastener 402 is fixed to an outer surface thereof at which the second front part is deployed to expand, and the first side hook and loop fastener 401 and the second side hook and loop fastener 402 are attached. FIG. 5 also shows the first fixed part 120 having a fixed surface 12a, and a second front part 220 having a fixed surface 220a.

Therefore, in the state in which passengers sit on left and right seats, when a lateral collision between a passenger sitting on one side and the first side part 110 or the second side part 210 occurs, as a gap between the first side part 110 and the second side part 210 is reduced, the first side hook and loop fastener 401 and the second side hook and loop fastener 402 are attached.

Therefore, as the side hook and loop fastener 400 provides an additional fastening force in addition to the front hook and loop fastener 300, the fastening force is further strengthened. Furthermore, a direct collision with the side passenger is prevented, so that the passenger is protected more safely.

Figure 3:
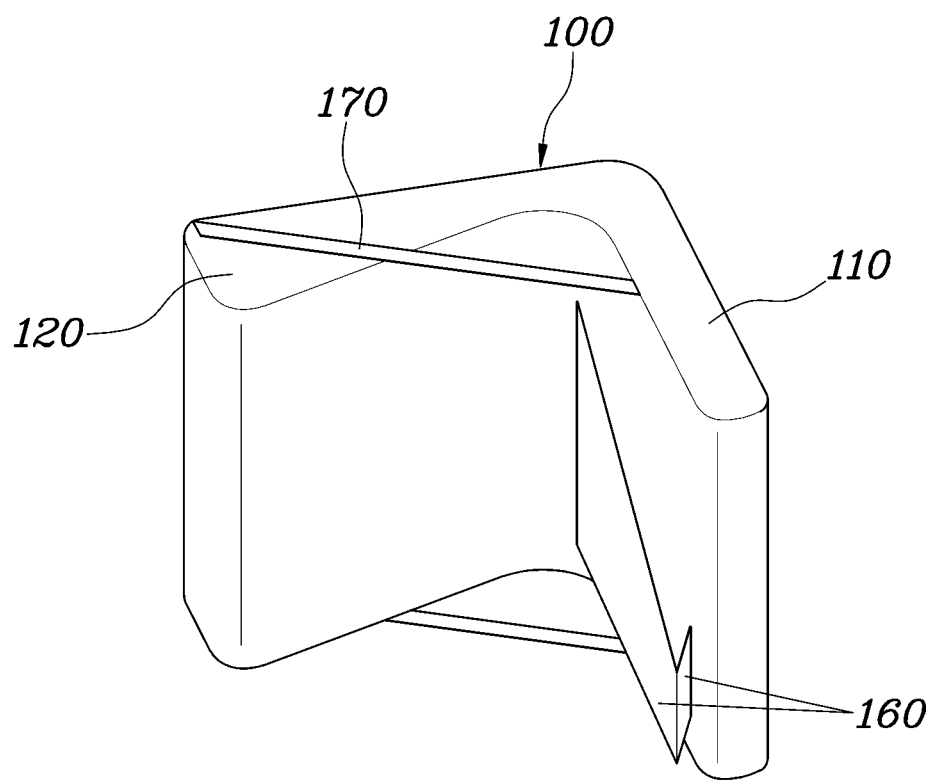
FIG. 3 is a view showing a shape of a side tether and a cross tether that are connected to the first chamber according to embodiments of the present disclosure.

Meanwhile, as shown in FIGS. 2 and 3, embodiments of the present disclosure may include a side tether 160 connected to at least one of a portion between the first portion of the seat back 22 and the first side part 110 and a portion between the second portion of the seat back 22 and the second side part 210.

For example, the side tether 160 is formed in a surface shape and at least one side tether may be applied.

For example, a first end of the side tether 160 is fixed to the first portion of the seat back frame, and a second end of the side tether 160 may be fixed to an inner surface of the front end of the first side part 110.

Furthermore, a first end of the side tether 160 is fixed to the first portion of the seat back frame, and a second end of the side tether 160 may be fixed to an inner surface of the rear end of the first side part 110.

Accordingly, when the air bag cushion 10 is deployed, the rotation amount of the first side part 110 rotated outward is minimized, thereby preventing the first front part 120 and the second front part 220 from moving away from each other, so that fastening robustness between the first chamber 100 and the second chamber 200 is secured.

Referentially, although not shown in the drawings, the first end of the side tether 160 is fixed to the second portion of the seat back frame, and the second end thereof may be fixed to the inner lateral surface of the front end of the second side part 210.

Furthermore, the first end of the side tether 160 is fixed to the second portion of the seat back frame, and the second end of the side tether 160 may be fixed to an inner surface of the rear end of the second side part 210.

In addition, embodiments of the present disclosure may include a cross tether 170 connected to the first side part 110 and the first front part 120 while being located therebetween.

For example, the cross tether 170 is formed in a strap shape or a band shape.

For example, a first end of the cross tether 170 is fixed to a location close to the rear end of the first side part 110, and a second end of the cross tether 170 may be fixed to an end of the first front part 120 close to the second side part 210.

Accordingly, when the air bag cushion 10 is deployed, the rotation amount of the first front part 120 rotated outward is minimized, thereby preventing the first front part 120 and the second front part 220 from moving away from each other, so that fastening robustness between the first chamber 100 and the second chamber 200 is secured.

Figure 4:
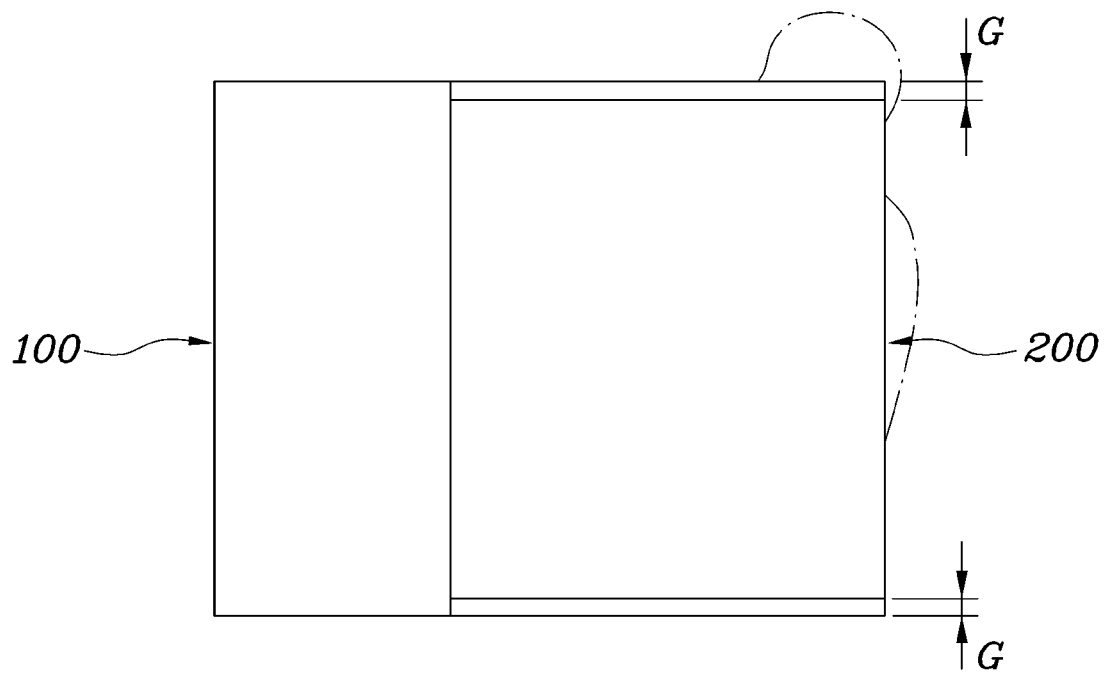
FIG. 4 is a view showing a step difference formed between the first chamber and the second chamber according to embodiments of the present disclosure.

At this point, as shown in FIG. 4, a height of the first chamber 100 is formed longer than a height of the second chamber 200 to form a step difference G, and the cross tether 170 may be configured to be unfolded within a region of the step difference G.

For example, the step difference G is formed between an upper surface of the first chamber 100 and an upper surface of the second chamber 200, and the step difference G is also formed between a lower surface of the first chamber 100 and a lower surface of the second chamber 200.

Accordingly, the cross tether 170 is applied to the step difference G formed between the upper end of the first chamber 100 and the upper end of the second chamber 200 and is also applied to the step difference G formed between the lower end of the first chamber 100 and the lower end of the second chamber 200.

As described above, with application of the step difference G, the cross tether 170 is prevented from being caught by the second chamber 200 in a deployment process of the cross tether 170, and thus the air bag cushion 10 is stably deployed.

Figure 12:
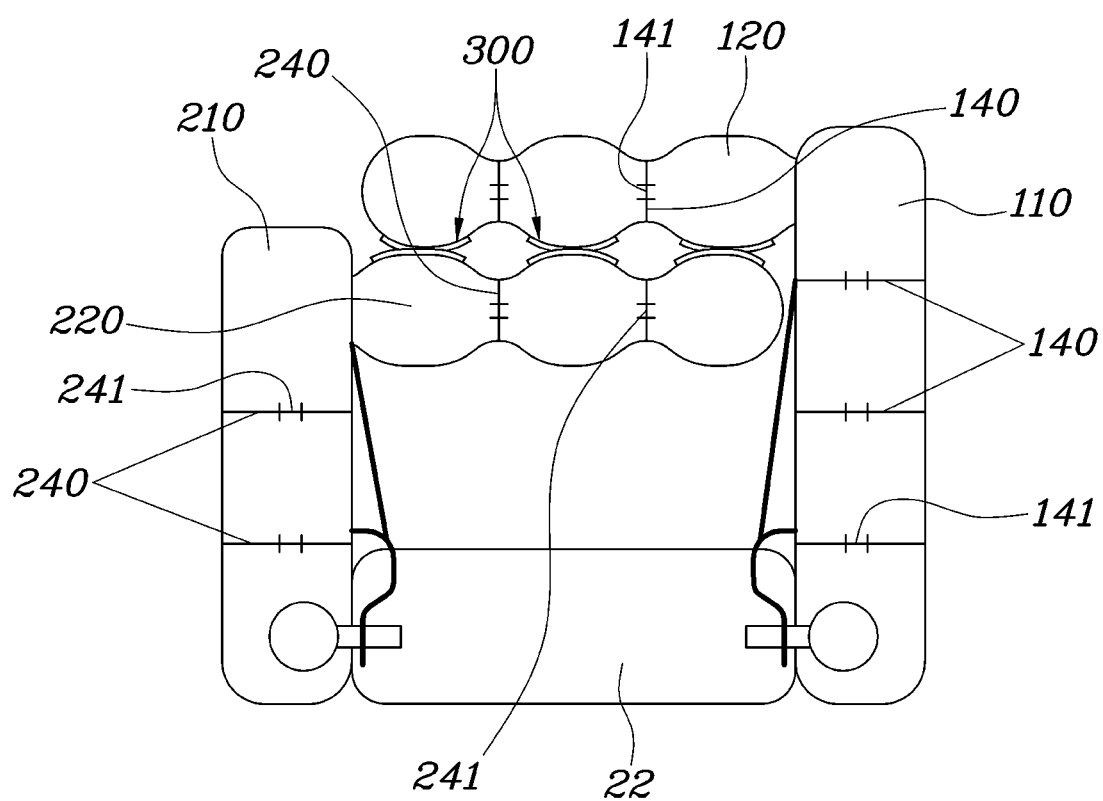
FIG. 12 is a view showing a connected state in which an inner tether is connected to an internal space of each of the first chamber and the second chamber according to embodiments of the present disclosure.

Meanwhile, as shown in FIG. 12, in embodiments of the present disclosure, an inner tether 140, 240 is connected to at least one or more of an internal portion in a transverse width direction of each of the first side part 110 and the second side part 210 and an internal portion in a longitudinal width direction of each of the first front part 120 and the second front part 220, and a flow hole 141, 241 through which gas flows may be formed in the inner tether 140, 240.

For example, at least one inner tether 140 is connected to the first side part 110 in the transverse width direction of the first side part 110 and at least one inner tether 140 is connected to the first front part 120 in the longitudinal width direction of the first front part 120 to restrict the shapes of the first side part 110 and the first front part 120.

In addition, at least one inner tether 240 is connected to the second side part 210 in the transverse width direction of the second side part 210 and at least one inner tether 240 is connected to the second front part 220 in the longitudinal width direction of the second front part 220 to restrict the shapes of the second side part 210 and the second front part 220.

At this point, the flow hole 141, 241 is formed at a middle portion of the inner tether 140, 240 so that gas flowing inside the chamber flows smoothly.

In addition, in the case in which a portion where the first front part 120 and the second front part 220 face each other is formed in an uneven shape by the inner tether 140, 240, the first front hook and loop fastener 301 and the second front hook and loop fastener 302 are partially applied to only a portion of which a longitudinal width thickness is relatively thick, thereby reducing production cost.

Meanwhile, embodiments of the present disclosure may include a second fastener provided at a portion wherein the first chamber 100 and the second chamber 200 are overlapped with each other, along a circumferential of the first fastener to fasten the first chamber 100 and the first chamber 100 to each other in a fastening method different from a fastening method of the first fastener.

The second fastener may be a first magnet 150 and a second magnet 250 fixed to the rear surface of the first front part 120 and the front surface of the second front part 220.

Figure 8:
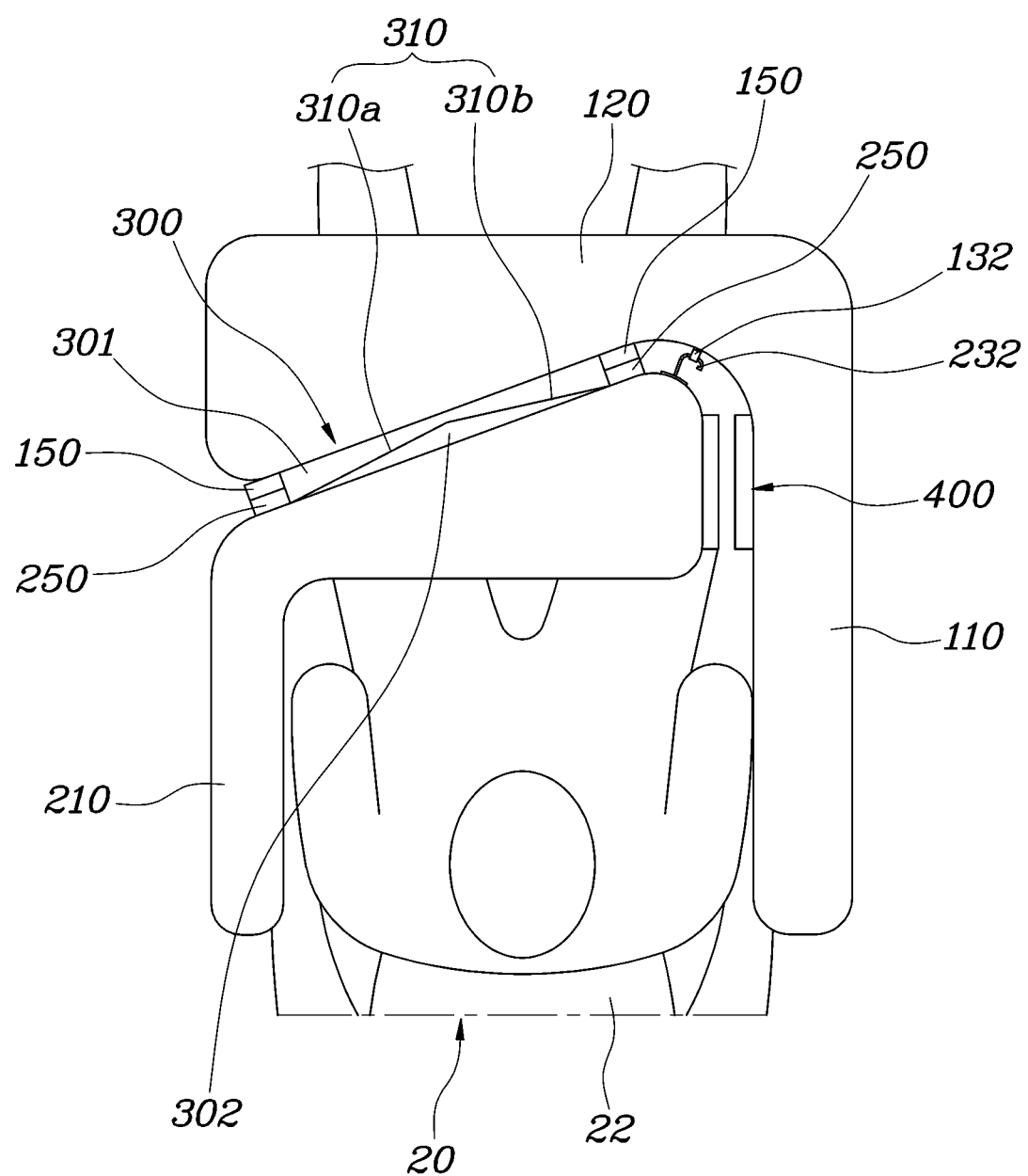
FIG. 8 is a view showing the first chamber and the second chamber that are fastened to each other with a hook and loop fastener, a magnet, a hook, and a bridge according to embodiments of the present disclosure.
Figure 9:
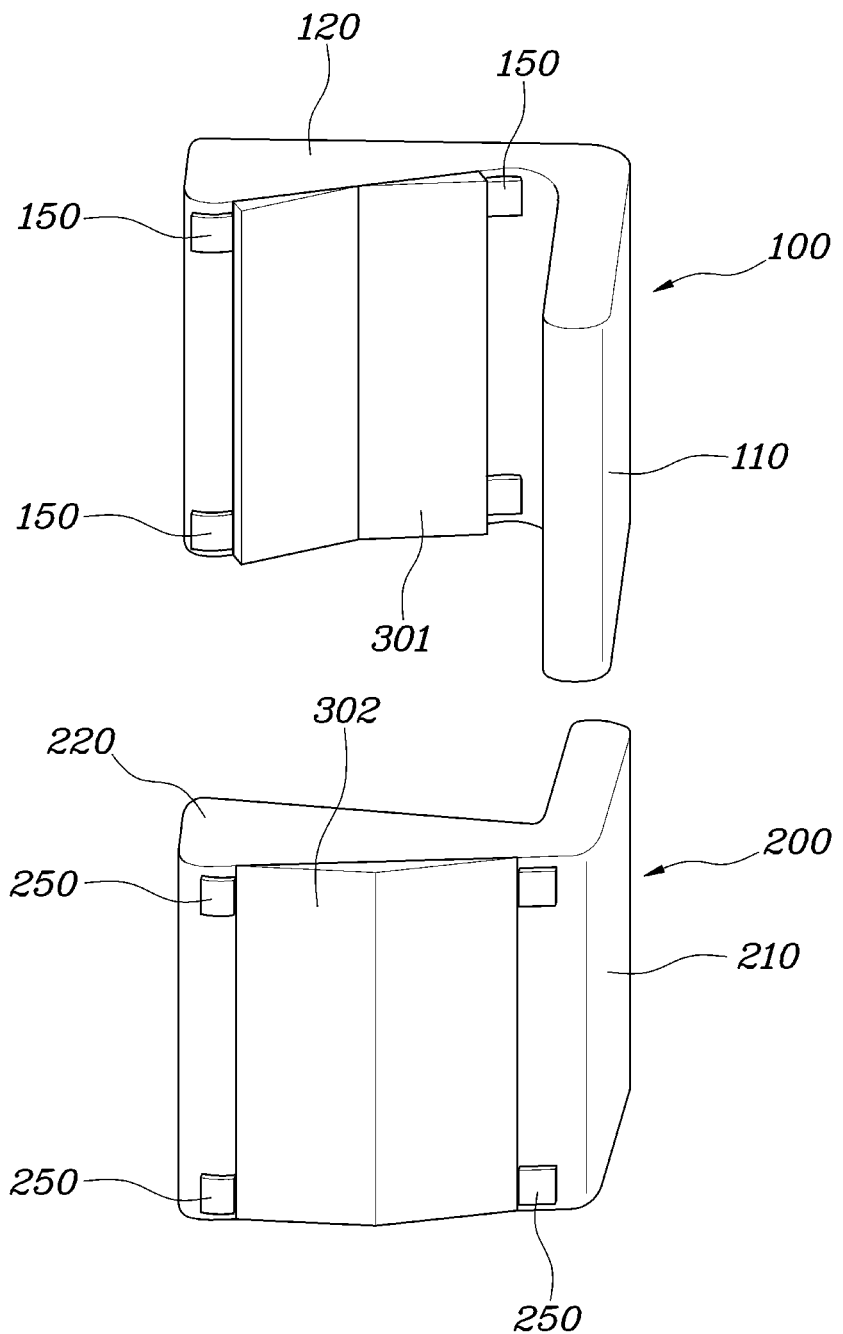
FIG. 9 is a view showing a location wherein first and second magnets are respectively fixed to the first chamber and the second chamber according to embodiments of the present disclosure.

When describing the second fastener referring to FIGS. 8 and 9, the first magnet 150 is fixed to a portion in the rear surface of the first front part 120, the portion being close to each corner of the first front hook and loop fastener 301.

In addition, the second magnet 250 fastened to the first magnet 150 is fixed to a portion in the front surface of the second front part 220, the portion being close to each corner of the second front hook and loop fastener 302.

Accordingly, with the fastening force of the first front hook and loop fastener 301 and the second front hook and loop fastener 302, the fastening force of the first magnet 150 and the second magnet 250 is added, so that the fastening force of the first chamber 100 and the second chamber 200 is further strengthened.

Figure 10:
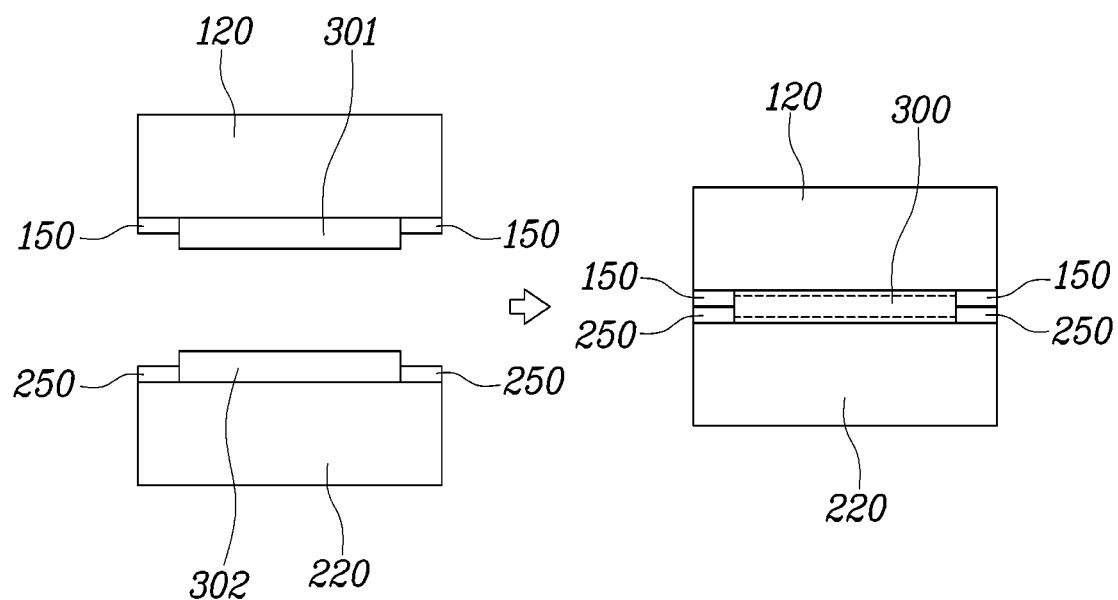
FIG. 10 is a view showing before and after states in which the first chamber and the second chamber are fastened to each other with the front hook and loop fastener and the magnet according to embodiments of the present disclosure.

At this point, as shown in FIG. 10, the first magnet 150 may be formed to have a height shorter than the height of the first front hook and loop fastener 301 fixed to the rear surface of the first front part 120 as the first fastener, and the second magnet 250 may be formed to have a height shorter than the height of the second front hook and loop fastener 302 fixed to the front surface of the second front part 220 as the first fastener.

In other words, as the height of the front hook and loop fastener 300 is formed longer than the height of the magnet, when the first magnet 150 and the second magnet 250 are fastened to each other to be compressed, the first front hook and loop fastener 301 and the second front hook and loop fastener 302 are fastened to each other by a fastening force of the magnet, so that the fastening force of the front hook and loop fastener 300 is additionally secured.

Meanwhile, embodiments of the present disclosure include a third fastener provided between a corner part 130 formed between the first side part 110 and the first front part 120 and the second front part 220 facing the corner part 130 and fastening the first chamber 100 and the second chamber 200 to each other in a different fastening method from the first fastener.

The third fastener includes a bridge 131 fixed to the corner part 130 and a hook 231 fixed to the second front part 220 to face the bridge 131 and fastened by being caught by the bridge 131.

Figure 11:
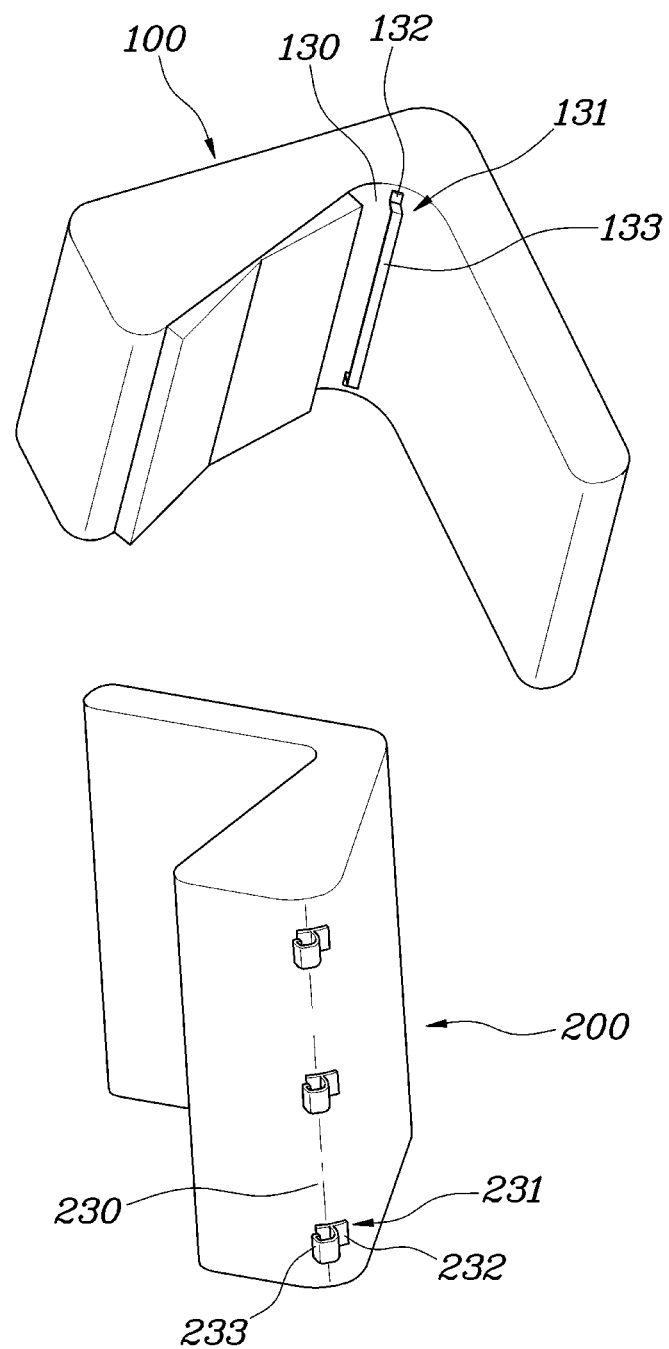
FIG. 11 is a view showing a location where the hook and the bridge are respectively fixed to the first chamber and the second chamber according to embodiments of the present disclosure.

Referring to FIGS. 8 and 11, the bridge 131 is formed in a vertically long handle, two legs 132 are respectively fixed to an upper end and a lower end of an inner surface of the corner part 130, and as the bridge 131 is spaced apart from the inner surface of the corner part 130, a holding part 133 is connected to the two legs 132 while being located therebetween.

The hook 231 is formed such that a rectangular fixation part 232 is fixed to an end 230 of an external surface of the second front part 220 facing the corner part 130 and a hook portion 233 is formed on the fixation part 232 toward the bridge 131, so that fastening is achieved as the hook portion 233 is caught by the holding part 133.

At this point, at least two or more hooks 231 are fixed in a vertical direction to secure fastening robustness between the hooks and the bridge 131.

Therefore, in a frontal/lateral collision, fastening between the hook 231 and the bridge 131 allows the rotating amount and the moving amount of the air bag cushion 10 to be reduced, in comparison with a structure in which only the front hook and loop fastener 300 is fastened, so that a fastening force of the front hook and loop fastener 300 is additionally secured to strengthen the fastening force between the first chamber 100 and the second chamber 200.

As described above, the first chamber 100 and the second chamber 200 are deployed in the shape surrounding the opposite portions of the passenger, and the first chamber 100 and the second chamber 200 are directly fastened to each other at a front of the passenger, so that an air bag cushion 10 surrounds entirely the opposite lateral spaces and the front space of the passenger sitting on the seat 20. Therefore, with respect to the seat 20 in various positions and various passenger's postures, the air bag device of embodiments of the present disclosure restrains the passenger, thereby responding to various collision modes to safely protect the passenger.

Although embodiments of the present disclosure were provided above in relation to specific embodiments shown in the drawings, it is apparent to those skilled in the art that the present disclosure may be changed and modified in various ways without departing from the scope of the present disclosure, which is described in the following claims.

What is claimed is:

1. An air bag device comprising:
  a first chamber, wherein in a deployed state, the first chamber surrounds a first portion and a front portion of a seat with a frontal surrounding portion of the first chamber expanding toward a second portion, wherein the first chamber comprises:
  a first side part fixed to the first portion of the seat and covering the first portion of the seat in the deployed state; and
  a first front part bent from a front end of the first side part toward the front portion of the seat and covering the front portion of the seat in the deployed state;
  a second chamber, wherein in the deployed state, the second chamber surrounds the second portion and the front portion of the seat with a frontal surrounding portion of the second chamber expanding toward the first portion and overlaps with the first chamber behind the first chamber, wherein the second chamber comprises:
  a second side part fixed to the second portion of the seat and covering the second portion of the seat in the deployed state; and
  a second front part bent from a front end of the second side part toward the front portion of the seat and covering the front portion of the seat and overlapping with the first front part behind the first front part in the deployed state;
  a first fastener provided at a portion where the first chamber and the second chamber overlap with each other and fastening the first chamber and the second chamber to each other with a first fastening type;
  a second fastener provided at the portion where the first chamber and the second chamber are overlapped with each other along a circumference of the first fastener and fastening the first chamber to the second chamber with a second fastening type different from the first fastening type; and
  a third fastener provided between a corner part and the second front part, the corner part being between the first side part and the first front part and the second front part facing the corner part, wherein the third fastener fastens the first chamber and the second chamber to each other with a third fastening type different from the first fastening type.

2. The air bag device of claim 1, wherein the first chamber and the second chamber are deployable with a time gap.

3. The air bag device of claim 1, wherein:
  a rear surface of the first front part and a front surface of the second front part face each other in a shape that is inclined rearward from the first portion toward the second portion; and
  the first fastener is fastened between the first front part and the second front part in a surface contact state.

4. The air bag device of claim 3, wherein the first fastener comprises a first front hook and loop fastener and a second front hook and loop fastener fixed to the rear surface of the first front part and the front surface of the second front part, respectively, the first front hook and loop fastener and the second front hook and loop fastener being configured to be attached to and detached from each other.

5. The air bag device of claim 4, wherein, in an attached state, a joined surface of the first front hook and loop fastener and the second front hook and loop fastener has a shape that is bent or curved in forward and rearward directions at least once.

6. The air bag device of claim 5, wherein the joined surface of the first front hook and loop fastener and the second front hook and loop fastener comprises:
  a first region having a shape that is bent toward the first side part based on a fixed surface where the first front hook and loop fastener and the second front hook and loop fastener are fixed to each of the first front part and the second front part; and
  a second region connected to the first region and having a shape that is bent toward the second side part based on the fixed surface.

7. The air bag device of claim 1, wherein the first fastener comprises a first side hook and loop fastener and a second side hook and loop fastener fixed to a lateral surface of the first side part and a lateral surface of the second front part, the first side hook and loop fastener and the second side hook and loop fastener being configured to be attached to and detached from each other.

8. The air bag device of claim 1, further comprising a side tether connected to a portion between a first portion of a seat back of the seat and the first side part or a portion between a second portion of the seat back of the seat and the second side part.

9. The air bag device of claim 1, further comprising a cross tether connected to the first side part and the first front part and located between the first side part and the first front part.

10. The air bag device of claim 9, wherein:
a height of the first chamber is greater than a height of the second chamber to define a step difference region; and
the cross tether is configured to be deployed within the step difference region.

11. The air bag device of claim 1, further comprising:
an inner tether connected to an internal portion in a transverse width direction of each of the first side part and the second side part or an internal portion in a longitudinal width direction of each of the first front part and the second front part; and
a flow hole in the inner tether, the flow hole configured to flow a gas therethrough.

12. The air bag device of claim 1, wherein the second fastener comprises a first magnet and a second magnet fixed to a rear surface of the first front part and a front surface of the second front part, respectively, wherein the first magnet and the second magnet are configured to be attached to and detached from each other.

13. The air bag device of claim 12, wherein:
the first fastener comprises a first front hook and loop fastener and a second front hook and loop fastener fixed to the rear surface of the first front part and the front surface of the second front part, respectively, the first front hook and loop fastener and the second front hook and loop fastener being configured to be attached to and detached from each other;
the first magnet has a height that is shorter than the first front hook and loop fastener; and
the second magnet has a height shorter than the second front hook and loop fastener.

14. The air bag device of claim 1, wherein the third fastener comprises:
a bridge fixed to the corner part; and
a hook fixed to the second front part to face the bridge and fastened by being caught by the bridge.

* * * * *